Patented May 6, 1924.

1,492,717

UNITED STATES PATENT OFFICE.

FRANK E. LICHTENTHAELER, OF NEWTON HIGHLANDS, MASSACHUSETTS.

METHOD OF CONCENTRATING AQUEOUS SOLUTIONS OF VOLATILE SUBSTANCES.

No Drawing.     Application filed August 11, 1922. Serial No. 581,245.

*To all whom it may concern:*

Be it known that I, FRANK E. LICHTENTHAELER, a citizen of the United States, residing at Newton Highlands, in the county of Middlesex and State of Massachusetts, have invented certain new and useful Improvements in Methods of Concentrating Aqueous Solutions of Volatile Substances; and I do hereby declare the following to be a full, clear, and exact description of the invention, such as will enable others skilled in the art to which it appertains to make and used the same.

The present invention relates to an improved method of concentrating aqueous solutions of volatile substances. The separation of water from various volatile substances is in some cases a matter of difficulty and expense. Thus, the separation of water from ethyl alcohol requires fractional distillation necessitating the employment of heat for evaporation and water for cooling. It requires the maintenance of accurate temperatures and constant attendance. The separation of water from other substances has likewise been a matter attended by difficulty and expense.

The object of the present invention is to produce a method of concentrating aqueously diluted water soluble volatile substances, and to this end the invention consists in the method hereinafter described and particularly defined in the claims.

The preferred mode of practicing the present invention is as follows:

To a quantity of aqueously diluted water-soluble volatile substance is added an amount of anhydrous hydrate-forming salt in a pulverulent state somewhat in excess of that required to satisfy the water content of the solution to be concentrated. This is stirred into the solution and combines with the water therein. This step should be performed deliberately so that an excessive rise of temperature will be avoided—cooling being employed if necessary to keep the temperature below the point of decomposition of the salt. The hydrated salt crystallizes and thus the water-soluble volatile substance assumes an anhydrous condition intimately associated with the hydrated salt. The mass, if solid, is reduced to pulverulent form and charged into a series of cells. The number of cells used will depend upon the degree of concentration desired and the facility with which the volatile substance is removed. A solvent, preferably water, having in saturated solution the hydrate-forming salt used for dehydrating, is passed through the cells in series, being introduced first into that cell of the series longest subjected to the process, and thence through cell after cell to the end. The solvent removes the last removable remnant of the volatile substance from the first cell and some from each of the others in its passage therethrough. From time to time, preferably at regular intervals, the first cell is cut out and a new cell is cut in at the end. The concentration of the solution passing through the series increases as it advances. The amount of solvent used is determined by the concentration of the volatile substance desired and the amount remaining in the cells after treatment.

The process is available for the concentration of aqueous solutions of water-soluble volatile substances containing various amounts of water such as aqueously diluted ethyl alcohol, methyl alcohol, formic acid, acetone, acetic acid, methyl acetate, and many other substances.

Various anhydrous hydrate-forming salts such as calcium chloride, iron sulphate, copper sulphate, sodium sulphate, alum, aluminum sulphate, or the like may be used. The quantity of the anhydrous salt introduced will depend upon the degree of concentration which it is desired to secure by the operation. If it is desired to crystallize out the entire water content of the solution, an amount of the anhydrous hydrate-forming salt will be added somewhat in excess of that theoretically required to combine with the entire water content of the solution. An excess of 5% is used in case of ammonium alum. Some hydrate forming salts are to be preferred to others. Thus, in concentrating non-acid solutions borax may be used as the hydrate-forming salt for the purpose, but this substance cannot be used with acid solutions because the acid would ordinarily decompose the borax. Other things being equal, a salt is to be preferred which combines with a large proportion of water, but in this connection the temperatures at which the hydrated salt melts and decomposes must be considered. Thus, aluminum sulphate hydrate and ammonium alum hydrate melt and decompose at temperatures in the neighborhood of 90° C., while sodium sulphate hydrate and calcium chloride hydrate, on the other hand, melt and decompose at approximately 30° C. In a climate where summer temperatures occasionally approximate 100° F., the working of the process on days of such temperatures would have to be given over if the salts used were Glauber's salt or calcium chloride, or, artificial cooling would have to be resorted to.

Selection of the salt is further indicated by its cost and facility of dehydration. Thus, alum is an inexpensive salt and may be dehydrated by melting and boiling off the water of distillation, care being exercised not to heat it to a temperature such as to cause decomposition. Furthermore, some salts when heated for the purpose of driving off the water of crystallization melt down into and solidify into extremely hard bodies which would require expensive grinding and pulverizing in order to be ready for re-use. This additional expense would be avoided by the selection of such a salt as will dehydrate to a friable mass easily pulverized.

In the case of concentrating a 10% solution of acetic acid by the use of alum, the intimately associated mixture of the crystallized hydrated salt and the concentrated volatile substance will appear to be a dry mass, in case an amount of anhydrous hydrate forming salt is used 5% in excess of that theoretically required to combine with the entire water content of the solution of the volatile substance. The odor of the volatile substance, if it be such a substance as has odor, is readily perceived, but in case of high dilutions where the amount of volatile substance is comparatively small with relation to the amount of water content, the presence of the volatile substance is not patently observable. Chemical tests, of course, and the odor will reveal it. In case of stronger solutions of the volatile substance, its presence in the mass may become visible as well as detectable by its odor.

While the volatile substance may be separated to a certain extent from the crystallized hydrated salt in some instances by centrifugal machines, or in some cases by evaporation, the use or non-use of such methods of separation in and of themselves form no feature of the present invention, which contemplates the removal of the volatile substance from the mass by the use of a solvent of the volatile substance. Any suitable solvent may be employed for this purpose, its requisite being that it should be a solvent for the volatile substance. Water, however, is regarded as the preferred solvent, not only by reason of the fact that it is inexpensive, as a consequence of which losses are of no account, whereas losses of some solvents would be a matter of considerable expense. For example, if acetone were used for the solvent, the losses incident to its use would be a continuous expense during the operation of the process. The solvent should preferably be a saturated solution of the hydrate forming salt used for the removal of the water of dilution of the volatile substance. It is preferred to use a saturated solution rather than a solvent without such salt in solution for the reason that while in the latter case it would soon saturate itself with a solution of the hydrating salt it would in so doing more or less channel the mass. The saturated solution employed is, of course, a solution saturated at the temperature of the extraction operation.

The step which consists in applying the saturated solution of the hydrate forming salt to the series of cells containing such salt and the volatile substance will be recognized as the well-known series extraction procedure as regularly practiced. The fresh solvent first serves to remove traces of volatile substance from the most nearly exhausted cell, and is then progressively concentrated by passage through the succeeding cells, the volatile substance being dissolved, extracted or displaced by the solvent and forced ahead of the solvent so as to issue from the freshly charged end cell in a highly concentrated condition, and, in case of a hydrate insoluble in the solvent, destitute or substantially destitute of its hydrate forming salt content. In such case, the amount of hydrate forming salt in the water as it passes through the series of cells gradually diminishes as the amount of volatile substance in the water increases. The amount of water used for extracting the volatile substance will be less in quantity, of course, than the water taken up by the hydrating process to which the dilute solution of the volatile substance has just been subjected, and the amount will be such as shall be selected to represent the degree of concentration desired, always bearing in mind, however, that the working of this process demands the use of a certain amount of water for displacing the volatile substance from the crystallized hydrated salt. By using a series of cells of suitable number a highly concentrated solution of the volatile substance is obtained. While the series extraction procedure will ordinarily be preferred to other methods of extraction, other methods may be employed. Thus, for example, the solvent applied to a batch of volatile substance bearing hydrated salt may be subsequently applied to another batch of such salt richer in the volatile substance, and so on.

The foregoing description of the present method has set it forth in broad and generic terms commensurate with the scope of the invention, the novel feature of which consists in the separation of the volatile substance from the hydrated crystallized salt by the employment of a solvent.

While the invention is thus to be regarded as broad and generic in character, a species of the genus is found in the process of concentrating acetic acid from vinegar. A description of this specific method of concentrating acetic acid is as follows: The acetic acid in the form of vinegar is cheaply produced by the quick vinegar process from molasses. This vinegar ordinarily has a strength of 10% acetic acid. After preliminary cleansing by filtration or centrifuging, to the dilute acetic acid is added anhydrous ammonium alum in the proportion of 125 lbs. of the latter to 100 lbs. of the dilute acetic acid. The anhydrous ammonium alum is produced by boiling off the water of crystallization from the hydrated alum of commerce, care being taken not to heat it to an excessive temperature such as to cause decomposition. This anhydrous salt is best when freshly prepared. It is pulverized and added to the acetic acid solution with requisite cooling and thorough mixing. When the reaction is complete and the mass has hardened, it is then pulverized, the acetic acid being free and in a highly concentrated condition. The removal of the acid is effected in a battery of extraction cells operated in a continuous series manner, that is to say, an aqueous saturated solution of the hydrate forming salt is admitted first to the cell which is most nearly exhausted and passes progressively to the other cells, the solution flowing out from each cell being progressively stronger in acetic acid than from the next preceding cell, the solution finally issuing from the end cell of the series which is charged with fresh acid-bearing crystallized hydrate. When the first cell is completely exhausted and is withdrawn, at the same time a freshly charged cell is thrown in at the end of the series. The solvent first serves to remove traces of acid from the most nearly exhausted cell, and is then progressively concentrated by passage through succeeding cells. The strong acid is displaced by the solvent, and is forced ahead of the solvent so as to finally issue from a freshly charged cell in a highly concentrated condition. The saturated solution of alum in water deposits alum as it takes up the acetic acid during its progress through the cells so that at the end of the process where the water is discharged from the last cell of the series its alum content is small.

The completely exhausted alum free from acetic acid is dehydrated as above described, and may then be re-used for dehydrating additional dilute acetic acid. The crude concentrated acetic acid then requires simple evaporation to remove solids and coloring matter.

The present invention may be employed in concentrating aqueous solutions of volatile substances of any strength. Thus, acetic acid may be concentrated from any dilution whether higher or lower than the 10% referred to.

The process is simple and economical. The operations may be carried out in wood equipment; expensive and complicated stills and evaporators are not required. This is important because it avoids the usual corrosion difficulties. The hydrate-forming salts used to take up the water in which the acetic acid is dissolved are cheap and capable of indefinite regeneration for re-use. There are no losses due to the consumption of the materials employed. The regeneration of the hydrate-forming salts is accomplished by direct heat, thus eliminating the use of steam, vacuum and evaporating processes. The evaporation process carried on at the end of the concentration of the acetic acid is restricted in volume to the actual amount of finished product, and simple evaporation suffices, there being no fractionation required.

A feature of importance resides in the fact that all of the volatile substance is concentrated to a single high strength, there being no weak grades of necessity produced, although it is apparent that the process may be employed to produce concentrated volatile substances of any desired strength. In the case of acetic acid produced by this process it is adapted for further dehydration or distillation for the production of glacial acid.

Having thus described the invention, what is claimed is:

1. The method of concentrating dilute acetic acid which consists in mixing therewith a quantity of anhydrous hydrate-forming salt to combine with the water, allowing the hydrated salt to crystallize and separating the acetic acid from the hydrated salt by passing water through the mass less in quantity than the amount of water removed by the hydrate forming salt.

2. The method of concentrating dilute acetic acid which consists in mixing therewith a quantity of anhydrous hydrate-forming salt to combine with the water, allowing the hydrated salt to crystallize, pulverizing the mass and separating the acetic acid from the hydrated salt by passing water through the mass less in quantity than the amount of water removed by the hydrate forming salt.

3. The method of concentrating dilute acetic acid which consists in mixing therewith a quantity of anhydrous hydrate-forming salt to combine with the water, allowing the hydrated salt to crystallize and separating the acetic acid from the hydrated salt by passing an aqueous solution of the salt through the mass containing water less in quantity than the amount of water removed by the hydrate forming salt.

4. The method of concentrating dilute acetic acid which consists in mixing therewith a quantity of anhydrous ammonium alum 5% in excess of that required to combine with the water, allowing the hydrated alum to crystallize and separating the acetic acid from the alum by passing water through the mass less in quantity than the amount of water removed by the hydrate forming salt.

5. The method of concentrating dilute acetic acid which consists in mixing therewith a quantity of anhydrous ammonium alum to combine with the water, allowing the hydrated alum to crystallize and separating the acetic acid from the alum by passing a saturated aqueous solution of alum through the mass.

6. The method of concentrating dilute acetic acid which consists in mixing therewith a quantity of anhydrous ammonium alum 5% in excess of that required to combine with the water content of the acetic acid, allowing the mixture to stand a time for the hydrated alum to crystallize, and separating the acetic acid from the alum by passing a saturated aqueous solution of the alum through the mass.

7. The method of concentrating aqueous dilutions of soluble volatile substances which consists in mixing therewith a quantity of anhydrous hydrate-forming salt to combine with the water, allowing the hydrated salt to crystallize and separating the volatile substance from the crystallized salt by passing water through the mass less in quantity than the amount of water removed by the hydrate forming salt.

8. The step in the method of concentrating aqueous dilutions of water-soluble volatile substances which consists in subjecting a mass of hydrated crystallized salt containing the volatile substance to the action of a saturated aqueous solution of such salt to wash out and carry off the volatile substance.

9. The method of concentrating dilute acetic acid which consists in mixing therewith a quantity of anhydrous hydrate-forming salt to combine with the diluent, allowing the hydrated salt to crystallize and separating the acetic acid from the hydrated salt by passing an acetic acid solvent through the mass less in quantity than the amount of water removed by the hydrate forming salt.

10. The method of concentrating dilute acetic acid which consists in mixing therewith a quantity of anhydrous hydrate-forming salt to combine with the diluent, allowing the hydrated salt to crystallize, pulverizing the mass and separating the acetic acid from the hydrated salt by passing an acetic acid solvent through the mass less in quantity than the amount of water removed by the hydrate forming salt.

11. The method of concentrating dilute acetic acid which consists in mixing therewith a quantity of anhydrous hydrate-forming salt to combine with the diluent, allowing the hydrated salt to crystallize and separating the acetic acid from the hydrated salt by passing a solution of the salt in an acetic acid solvent through the mass containing water less in quantity than the amount of water removed by the hydrate forming salt.

12. The method of concentrating aqueous dilutions of soluble volatile substances which consists in mixing therewith a quantity of anhydrous hydrate-forming salt to combine with the water, allowing the hydrated salt to crystallize and separating the volatile substance from the crystallized salt by passing a solvent of the volatile substance through the mass less in quantity than the amount of water removed by the hydrate forming salt.

13. The step in the method of concentrating aqueous dilutions of water-soluble volatile substances which consists in subjecting a mass of hydrated crystallized salt containing the volatile substance to the action of a saturated solution of such salt in a solvent of the volatile substance to wash out and carry off the volatile substance.

14. The method of concentrating aqueous dilutions of water soluble volatile substances which consists in mixing therewith a quantity of anhydrous hydrate-forming salt to combine with the water, allowing the hydrated salt to crystallize, and separating the volatile substance from the crystallized salt by subjecting the mass to the action of a solvent of the volatile substance less in quantity than the amount of water removed by the hydrate forming salt in a battery of extraction cells operated in a continuous series manner to wash out and carry off the volatile substance.

15. The step in the method of concentrating aqueous dilutions of water soluble volatile substances which consists in subjecting a mass of hydrated crystallized salt containing the volatile substance to the action of a saturated solution of such salt in a solvent of the volatile substance in a battery of extraction cells operated in a continuous series manner to wash out and carry off the volatile substance.

16. The method of concentrating dilute acetic acid which consists in mixing therewith a quantity of anhydrous hydrate-forming salt to combine with the water, allowing the hydrated salt to crystallize, and separating the acetic acid from the hydrated salt by passing water through the mass less in quantity than the amount of water removed by the hydrate forming salt in a battery of extraction cells operated in a continuous series manner to wash out and carry off the acetic acid.

17. The step in the method of concentrating dilute acetic acid which consists in subjecting a mass of hydrated crystallized ammonium alum containing the acetic acid to the action of a saturated aqueous solution of the alum in a battery of extraction cells operated in a continuous series manner to wash out and carry off the acetic acid.

FRANK E. LICHTENTHAELER.